US005538386A

United States Patent [19]
Scheibel

[11] Patent Number: 5,538,386
[45] Date of Patent: Jul. 23, 1996

[54] SELF-LOADING MATERIAL OR EQUIPMENT TRANSPORTER

[76] Inventor: Craig C. Scheibel, 705 E. Green Tree Rd., Milwaukee, Wis. 53217

[21] Appl. No.: 257,798

[22] Filed: Jun. 10, 1994

[51] Int. Cl.$^6$ ..................................................... B66F 9/06
[52] U.S. Cl. .................. 414/467; 414/347; 414/399; 414/458; 414/498
[58] Field of Search ................................ 414/340, 345–7, 414/391–2, 399, 458, 639, 672, 467, 498, 343

[56] References Cited

U.S. PATENT DOCUMENTS

| | | | |
|---|---|---|---|
| 3,865,262 | 2/1975 | Smith, Jr. ......................... | 414/498 X |
| 3,885,685 | 5/1975 | Montgomery et al. ............... | 414/391 |
| 3,972,427 | 8/1976 | Stanley et al. ..................... | 414/467 X |
| 4,015,736 | 4/1977 | Erickson .......................... | 414/458 |
| 4,050,672 | 9/1977 | Lane .............................. | 414/458 X |
| 4,103,795 | 8/1978 | Miller ............................ | 414/347 X |
| 4,119,044 | 10/1978 | Hines . | |
| 4,316,687 | 2/1982 | Lindskog .......................... | 414/498 X |
| 4,408,739 | 10/1993 | Buchsel .......................... | 414/498 X |
| 4,460,064 | 7/1984 | Lutz et al. ........................ | 414/467 X |
| 4,522,326 | 6/1985 | Tuohy, III . | |
| 4,604,022 | 8/1986 | Bourgraf .......................... | 414/347 X |
| 4,613,272 | 9/1986 | vom Braucke et al. ............... | 414/347 |
| 4,632,627 | 12/1986 | Swallows ......................... | 414/672 X |
| 5,018,931 | 5/1991 | Uttley ............................ | 414/347 X |
| 5,088,636 | 2/1992 | Barajas . | |
| 5,217,342 | 6/1993 | Grether .......................... | 414/392 X |
| 5,322,496 | 6/1994 | Ernst et al. ...................... | 414/346 X |

FOREIGN PATENT DOCUMENTS 2138750  10/1984  United Kingdom .

*Primary Examiner*—James W. Keenan
*Attorney, Agent, or Firm*—Andrus, Sceales, Starke & Sawall

[57] ABSTRACT

A transporter for moving a container or platform between storage and work positions at different levels. The transporter including a lift assembly and a support assembly pivotally mounted on the lift assembly. The lift assembly being operatively connected to the support assembly for movement between transporting and storage positions. The support assembly including a first set of rollers for moving said lift assembly between the work and storage positions at one level and a second set of rollers for moving the lift assembly to the work or storage positions at a second level.

10 Claims, 13 Drawing Sheets

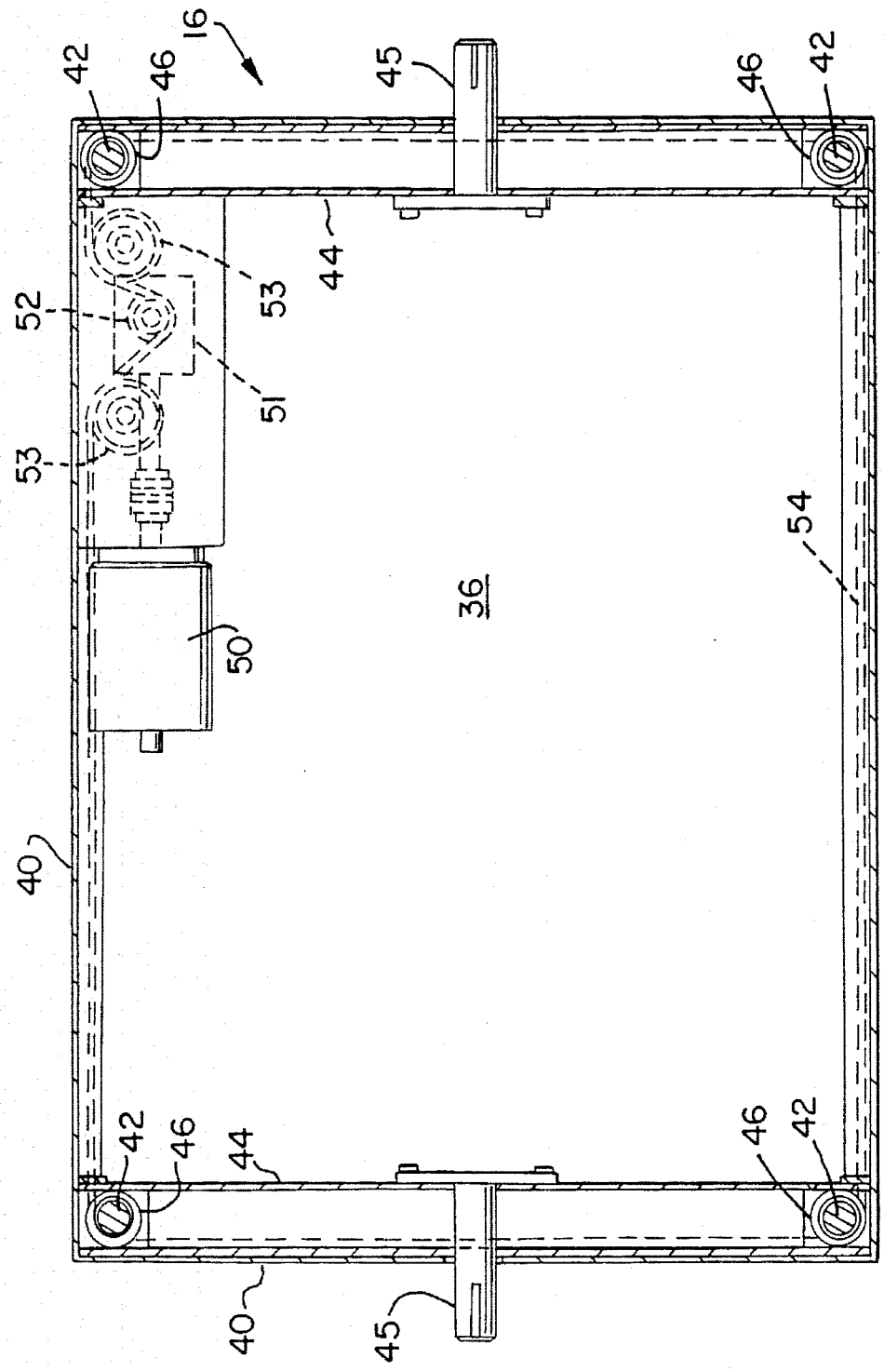

5,538,386

SELF-LOADING MATERIAL OR EQUIPMENT TRANSPORTER

FIELD OF THE INVENTION

The present invention relates generally to a transporter for lifting equipment to an elevated surface and for lowering the equipment therefrom, and more particularly to a transporter which includes a support assembly and a lift assembly for raising or lowering a container or platform.

BACKGROUND OF THE INVENTION

Heavy and bulky material or equipment are difficult to handle both from different heights and different locations. The equipment used, however, must be readily transportable from one location to another. For instance, a tool box may be used at a variety of different job sites and will typically be hauled from one site to the next by a pickup truck or van.

One problem with loading such equipment as a conventional tool box is the loading and unloading of the box into and out of the vehicle. Often, the tool box is too heavy to manually load and unload without risk of injury or it takes numerous trips to move the equipment between the vehicle to a work location. Consequently, a hoist or forklift will be used to load and unload the equipment. This, of course, requires such additional machinery at the job site.

On the other hand, the tool box is left loaded on the vehicle. However, this presents additional problems since the vehicle and the tools are often required at separate locations.

There are many other situations where a relatively heavy load must be raised to an elevated surface or platform or lowered to a surface. This typically requires some type of separate equipment at the designated site for handling such heavy loads. It would be advantageous to have a self-contained assembly which included the equipment and a mechanism for independently loading and unloading the equipment.

SUMMARY OF THE PRESENT INVENTION

The present invention features a transporter having a support assembly for moving the transporter between different locations and a lift assembly to move a storage container or platform between a lower level and a higher level. The storage container may be in the form of a tool box or a platform for supporting various types of equipment. The transporter generally includes a support assembly for transporting the storage container to various job sites and a lift assembly for elevating the storage container as required at the work site. According to a particular preferred embodiment of the invention, the support assembly is generally C-shaped.

The lift assembly is mounted on the support assembly to transport the container or platform between work or storage positions. The lift assembly is configured to facilitate movement of the container or platform between a lower level and a surface disposed at a higher level. The lift assembly also is used to raise the transport assembly to a storage position with respect to the lift assembly. The transport assembly is pivoted about the lift assembly and lowered onto the raised surface for transporting the container on the raised surface. The lift assembly then raises the container to the higher level and preferably with the container supported over the raised surface. The lift assembly also allows these movements to be reversed so that the equipment may be moved from the higher level to the lower level.

One of the primary objects of the invention is to provide a transporter which has the capability to transport and elevate heavy equipment over surfaces at different elevations.

A further object is to provide a transporter wherein the support assembly can be quickly and easily stored with the storage container.

Another object of the invention is to provide the support assembly with two sets of roller assemblies for transporting the transporter at both transporting and storage positions.

One of the primary advantages of the transporter is to reduce the time required to set up the equipment for ready access to the user.

Another advantage of the transporter is the ability of the lift assembly to raise and lower the platform or container in relation to the support assembly or raise and lower the support assembly in relation to the container or platform.

A further advantage of the transporter is the ability of the support assembly to fully sustain the load without manual effort or reliance on other structure.

Another advantage of the transport is that the entire assembly is transportable at either level using the support assembly.

BRIEF DESCRIPTION OF THE DRAWINGS

The invention will hereafter be described with reference to the accompanying drawings, wherein like referenced numerals denote like elements, and:

FIG. 6 is a top view of the container cut away to show the chain drive assembly for rotating the lead screws;

Figure 1:
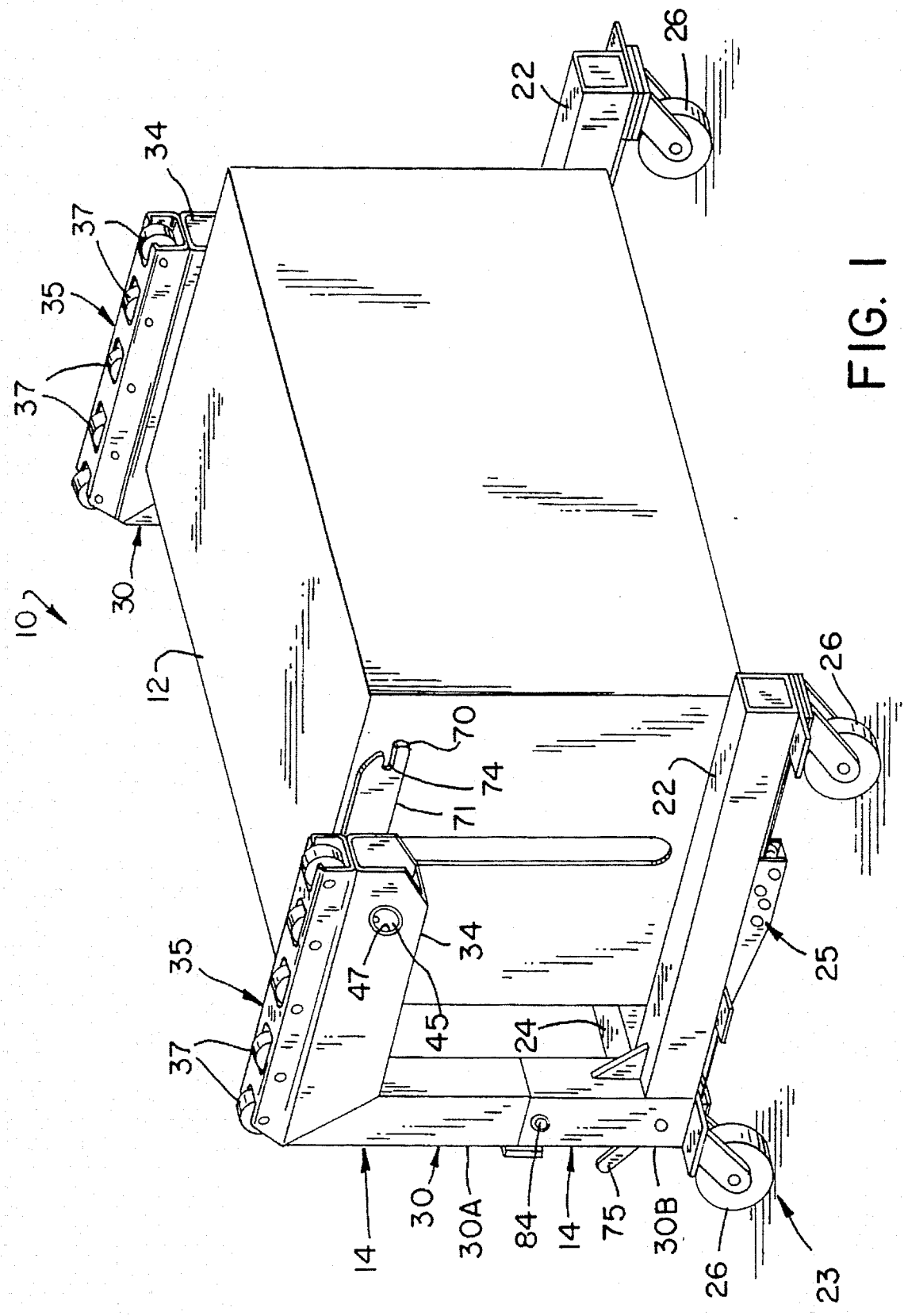
FIG. 1 is a perspective view of the transporter according to the invention.

Before explaining at least one embodiment of the invention in detail it is to be understood that the invention is not limited in its application to the details of construction and the arrangement of the components set forth in the following description or illustrated in the drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENTS

Figure 5:
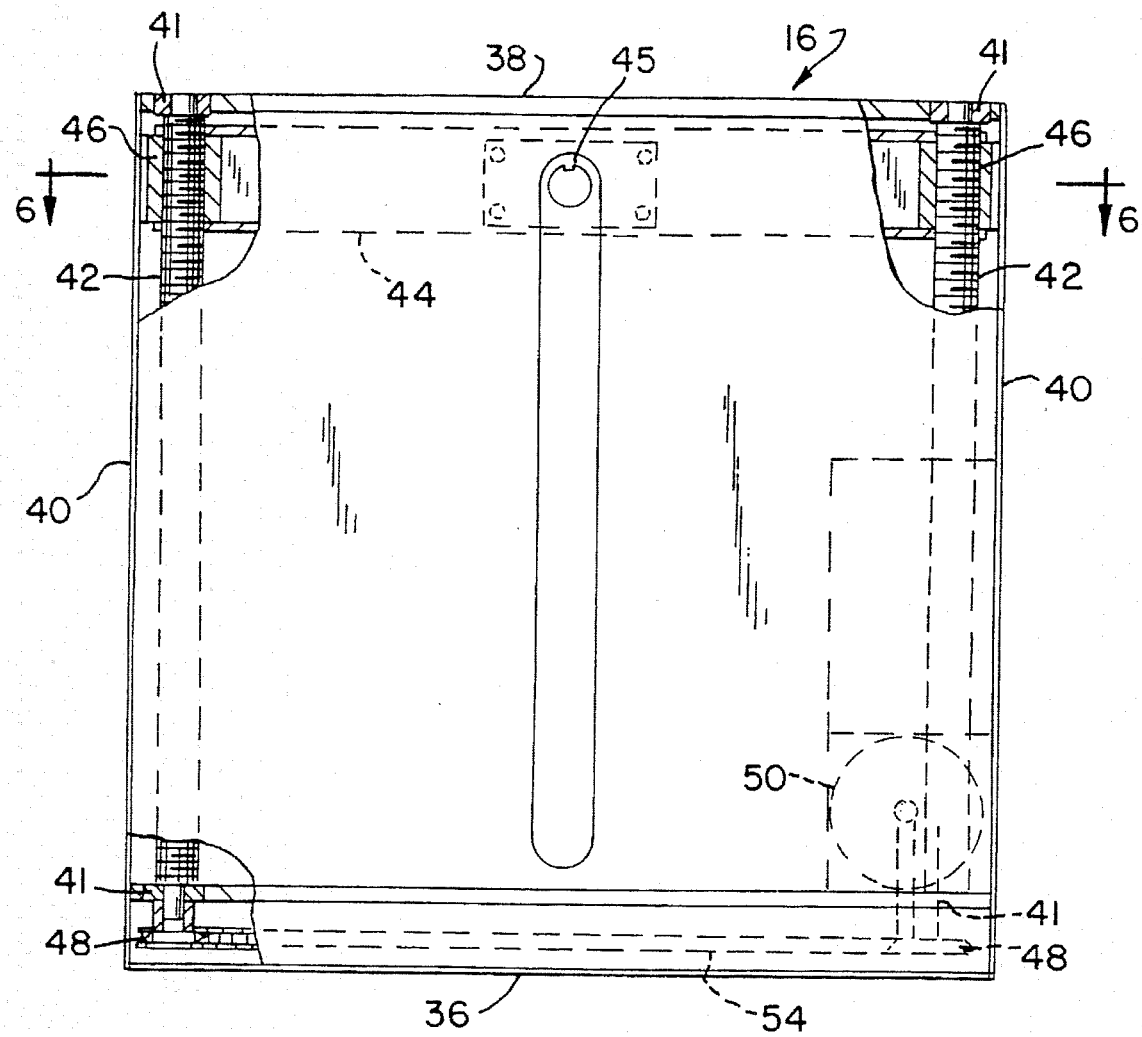
FIG. 5 is a side view of the container partly broken away to show the lift assembly.

The present invention relates to a load and go transporter 10, as shown in FIG. 1, for moving a storage container 12 such as a tool box or the like to and from locations at different height levels. The transporter 10 generally includes a support assembly 14, FIGS. 2 and 3, a cross tube 44, FIG. 4, for connecting the lift assembly 16, FIG. 5, to the support assembly 14 with a container 12 connected to the lift assembly 16. The support assembly 14 provides the means for moving the transporter 10 between storage and work positions. The lift assembly 16, as shown in FIG. 5, provides the means for raising and lowering the container 12 to positions at different elevations.

Figure 2:
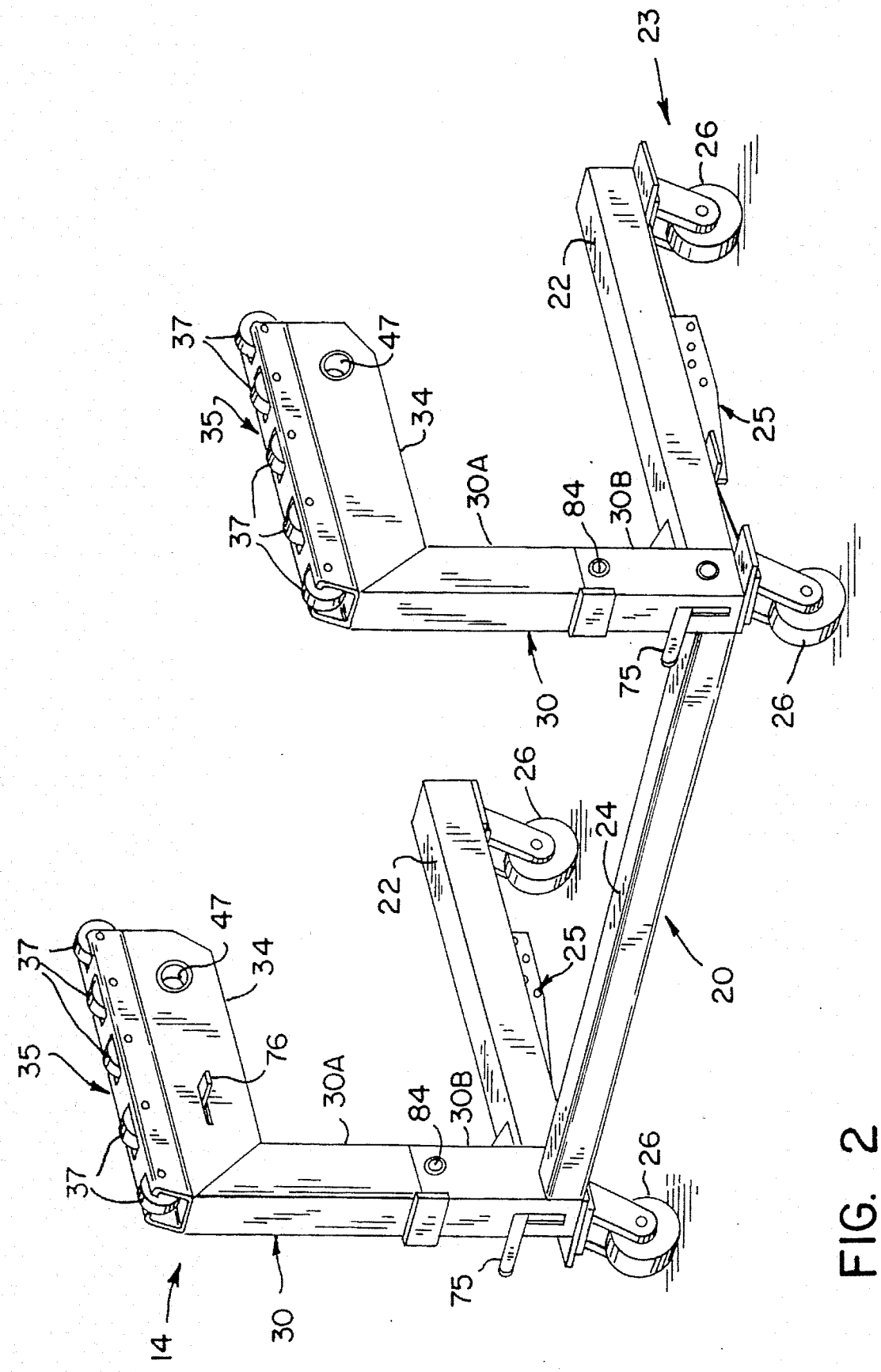
FIG. 2 is a perspective view of the support assembly.
Figure 3:
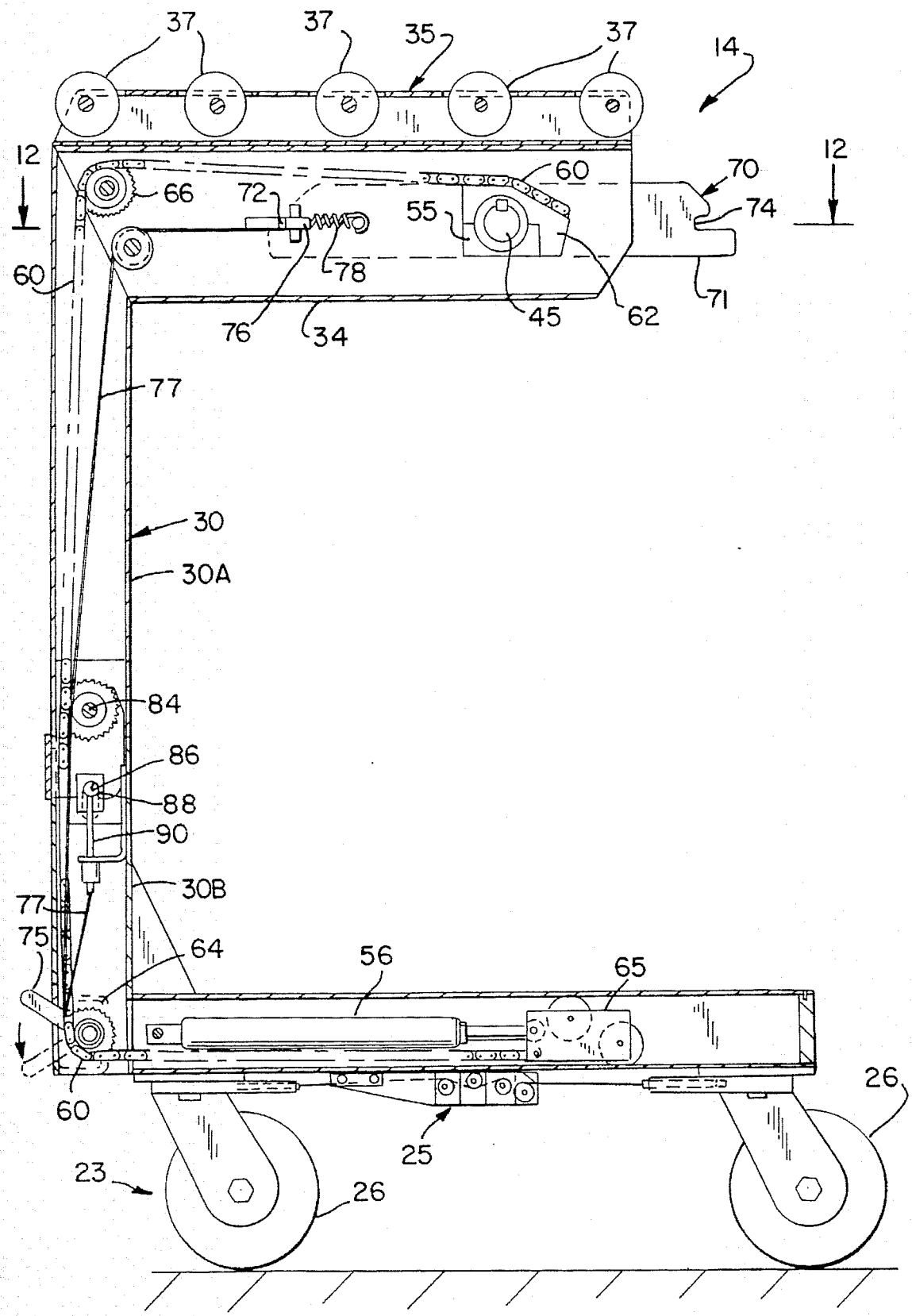
FIG. 3 is a side view of the support assembly partly broken away to show the counterbalance and lock mechanisms.
Figure 4:
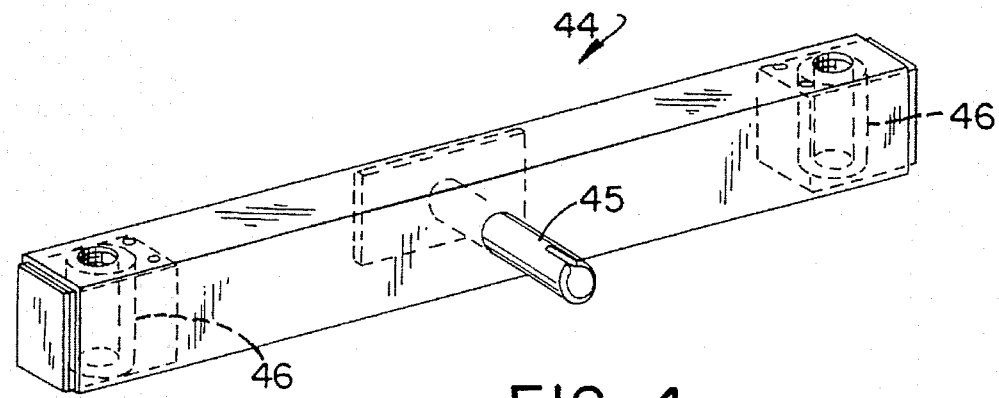
FIG. 4 is a perspective view of the lift bar.
Figure 7:
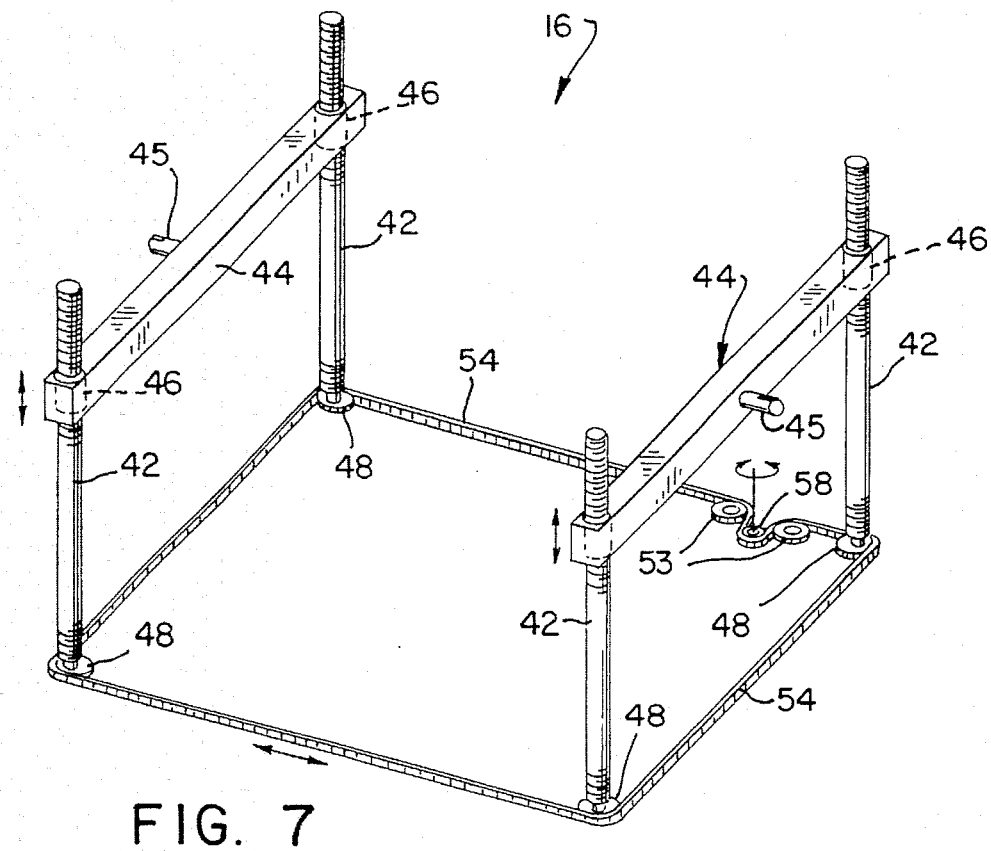
FIG. 7 is a perspective view of the cross bar with the lead screws shown threaded through the nuts in the cross bar.

The support assembly 14 as shown in FIGS. 2 and 3 generally includes a base frame 20 having a pair of legs 22 interconnected at one end by a cross member 24. A primary roller assembly 23 in the form of a set of swivel type wheel assemblies 26 are provided at the front and back of the legs 22. A foot actuated lock assembly 25 may be provided on the bottom of one or both of the legs 22 for locking the wheel assemblies 26 in a fixed position. A pair of vertical tube assemblies 30 are mounted on the back of each of the legs 22 to support a pair of horizontal brackets 34 mounted on the upper end of the tube assemblies 30 in a parallel relation to each other and to the legs 22. A secondary set of rollers 35 are mounted on the outside of each of the brackets 34 with the rollers 37 located above the brackets 34.

Figure 8:
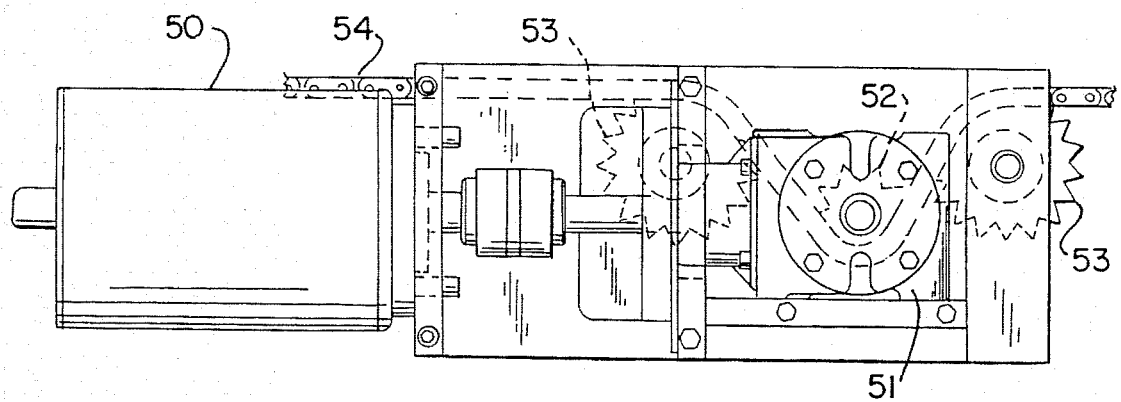
FIG. 8 is a top view of the powered chain drive mechanism.
Figure 9:
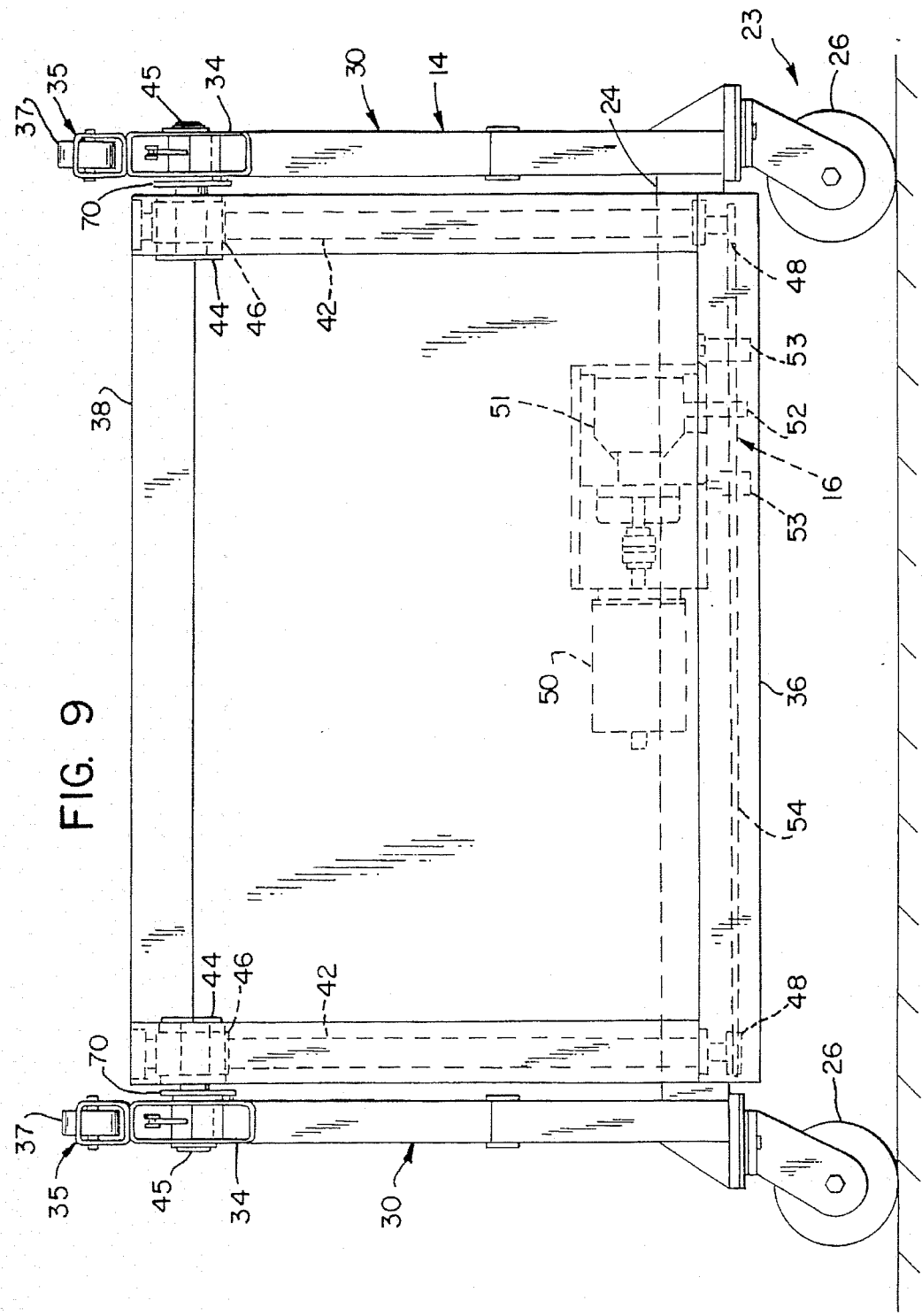
FIG. 9 is a view of the transporter with the lift assembly and container shown in the transport position.

The lift assembly 16, as shown in FIGS. 5 through 9, includes a lower rectangular panel 36, and an upper rectangular panel 38 enclosed by wall panels 40. A vertical lead screw 42 is mounted in each of the corners of the panels 36 and 38. The lead screws 42 are supported therein by thrust and radial bearings 41 provided at each end of lead screws 42 in the panels 36 and 38. A cross tube 44 is mounted on the upper end of each pair of lead screws 42 with a nut 46 mounted on each lead screw 42 and captured in the ends of the cross tubes 44. A sprocket 48 is mounted on the bottom of each lead screw 42. An electric drive gear motor 50, FIG. 8, is connected to a drive sprocket 52 through a gear box 51 mounted on the lower panel 36. A hand crank may also be connected to the gear box 51 to actuate the lift assembly. A guide sprocket 53 is mounted on the panel 36 on each side of the sprocket 52 to align a roller chain 54 with the sprockets 48 on the bottom of the lead screws 42. On actuation of the motor 50 the lead screws 42 rotate with respect to the nut 46 raising the lift assembly 16 up or down with respect to the cross tubes 44. The cross tubes 44 are provided with pins 45 which pass through openings 47 in the mounting brackets 34 for supporting the cross tube 44 on the support assembly 14.

The mounting brackets 34 are provided with a lock lever assembly 70 for locking the support assembly 14 in the upright and in the upside down positions. In this regard the lock lever assembly 70 includes a pair of lock plates 71, each having a notch 72 and 74 in opposite ends of each of the plates 71. One plate 71 is mounted on the pin 45 on the outside of each of the cross tubes 44. A lock pin 76 is mounted on the bracket 34 in a position to engage one of the notches 72, 74. The lock pin 76 is biased by springs 78 into engagement with the notches 72 and 74. The lock pin 76 is withdrawn from the notches 72, 74 by means of a foot actuated pedal 75 which is connected to the lock pin 76 by a cable 77. The support assembly 14 can then pivot about the pivot pin 45 as described hereinafter.

Once the lift assembly 16 is positioned above the platform or deck 80 of the vehicle, the motor 50 is reversed to lower the container 12 onto the deck 80, the lift assembly 16 continues to run after the container is seated on the platform to raise the wheels 26 approximately 6 to 8 inches off the ground.

Figure 10:
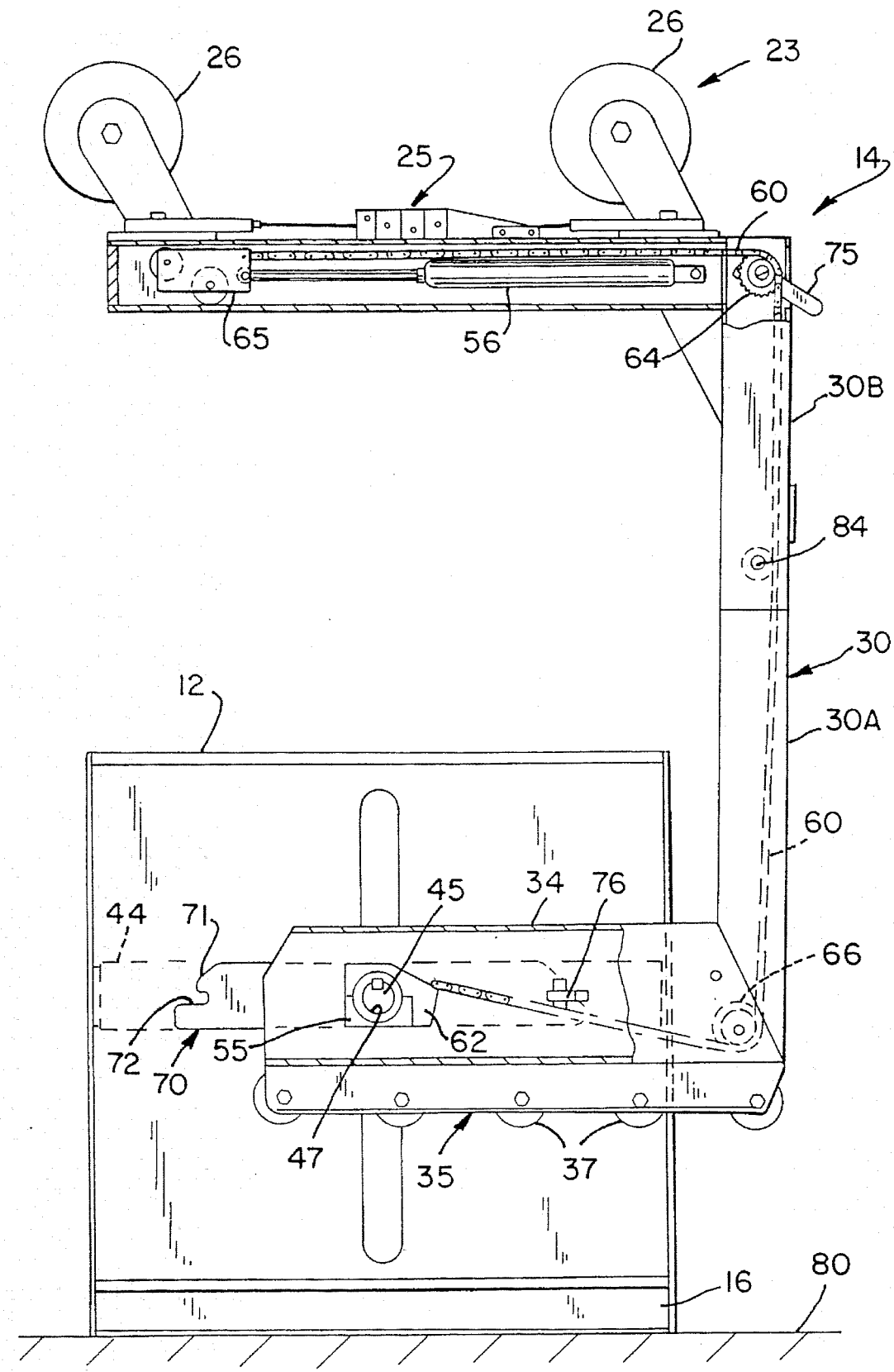
FIG. 10 is a side view of the support assembly pivoted to the inverted position with respect to the container.
Figure 12:
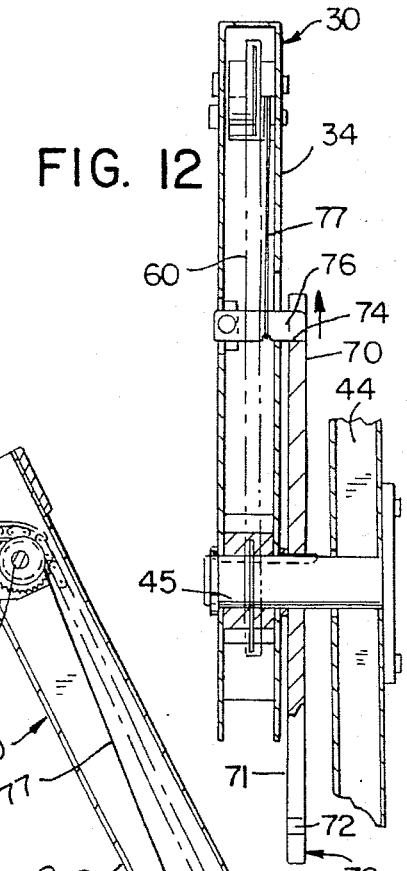
FIG. 12 is a view taken on line 12—12 of FIG. 3.

The support assembly 14 is then manually pivoted about pins 45 to a storage position with respect to the lift assembly 16. The support assembly 14 is biased by a gas spring 56 to the storage position. In this regard, a plate 55 is keyed to each of the pins 45 provided on each of the cross tubes 44. A cable or chain 60 has one end connected to an arm 62 of the plate 55 and the other end connected to a trolley 65 at the end of the gas spring 56. The gas spring 56 is mounted in each of the lower legs 22 of the support assembly 14. The chain 60 is wrapped around sprockets 64 and 66 at each end of the tubular uprights 30 with the end of each chain 60 connected to the trolley 65 at the end of the gas spring 56. When the support assembly 14 is lifted up it will pivot around the pins 45. The chain 60 will pivot around the end of the arm 62 on the plate 55 as the support assembly pivots to the storage position as shown in FIGS. 10 and 11.

The legs will initially pivot approximately 30° to 45° by the counterbalance force of the gas spring 56. The operator adds additional lift to rotate the legs past the horizontal position. As the legs go over horizontal the lock pin 76 will move into the notch 74 in the plate 70 to lock the support assembly in the upside down position as shown in FIG. 10.

Figure 11:
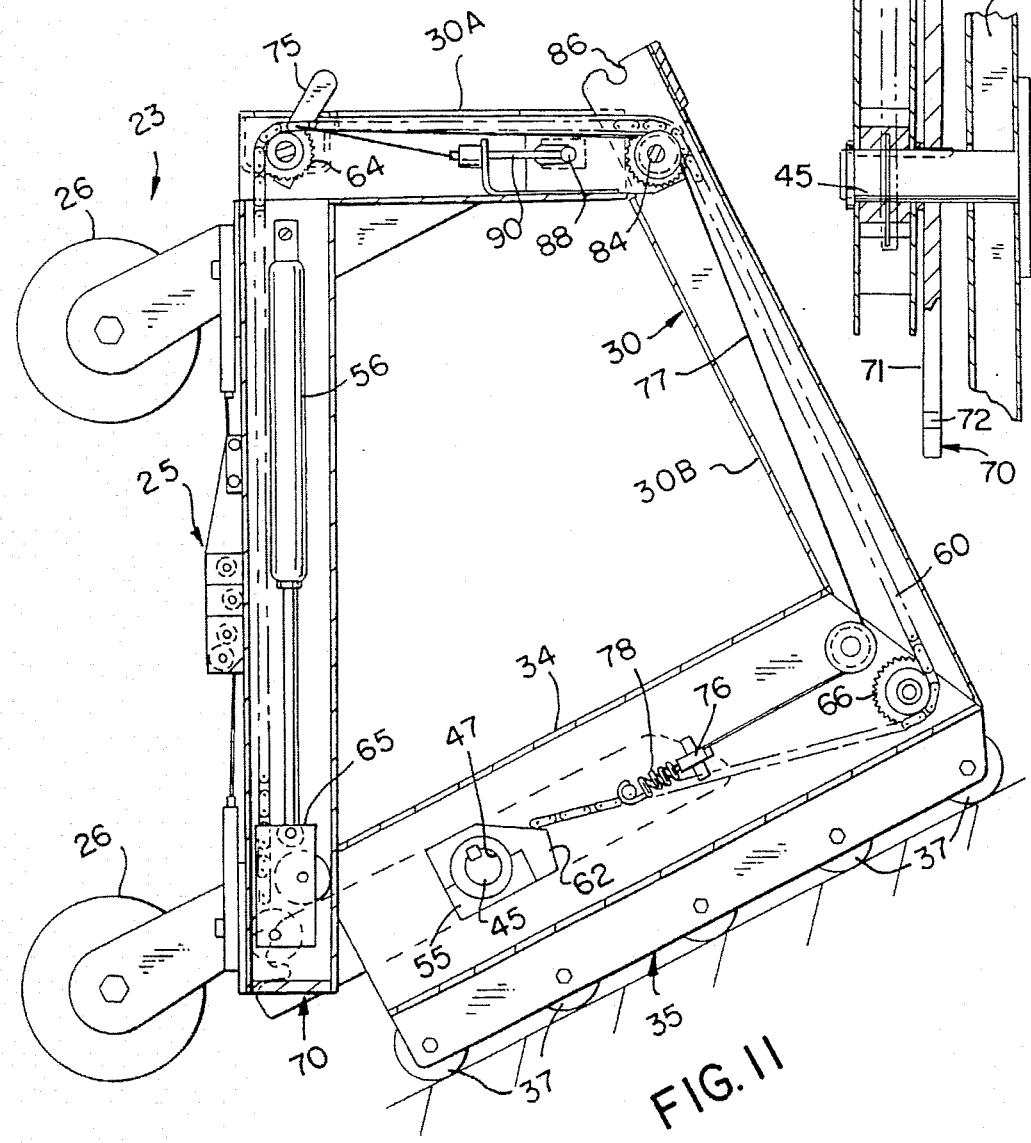
FIG. 11 is a side view of the folding support assembly shown in the storage position.

The support assembly 14 may be folded to a storage position as shown in FIG. 11 by pivoting the lower section about a pivot pin 84. In this regard, the uprights 30 are split into two sections 30A and 30B. A notch 86 is provided in the end of section 30B. A pin 88 mounted on the lower section 30A is biased by a spring 90 into engagement with the notch 86. The pin 88 is connected to the foot pedal 75 by a cable 79 and is released from the notch 86 at the same time that the foot pedal 75 is actuated to release the support assembly so that the support assembly can pivot to the storage position.

Once the support assembly 14 is locked in the upside down position, the lift mechanism is reversed so that the support assembly 14 moves downward. The secondary roller assembly 35 on the support assembly 14 will engage the deck and the container will then be lifted off of the deck so that it is supported by the secondary roller assembly 35. The secondary roller assembly 35 can then be used to move the transporter to the end of the platform.

Figure 13:
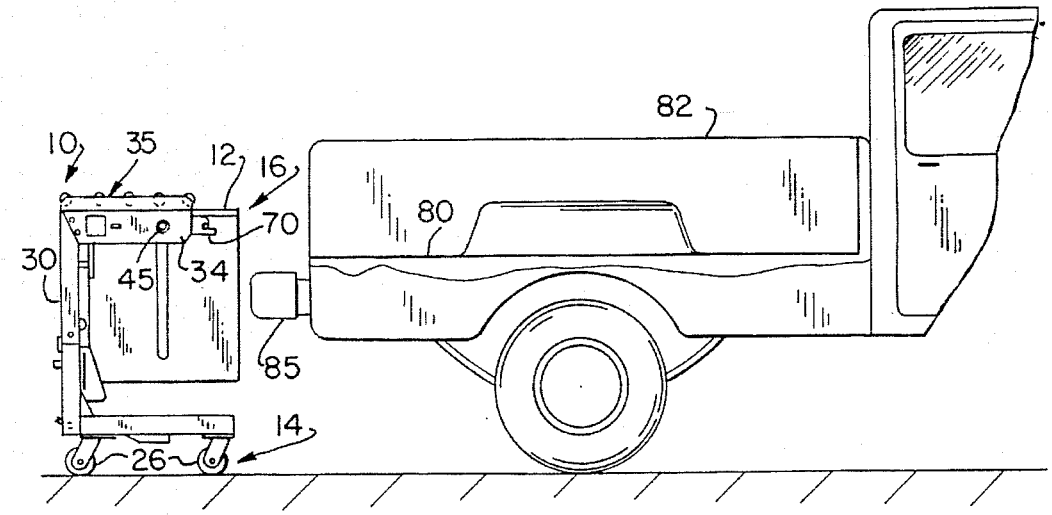
FIG. 13 is a side view of the transporter with the container shown in position to be loaded on the deck of a truck.
Figure 14:
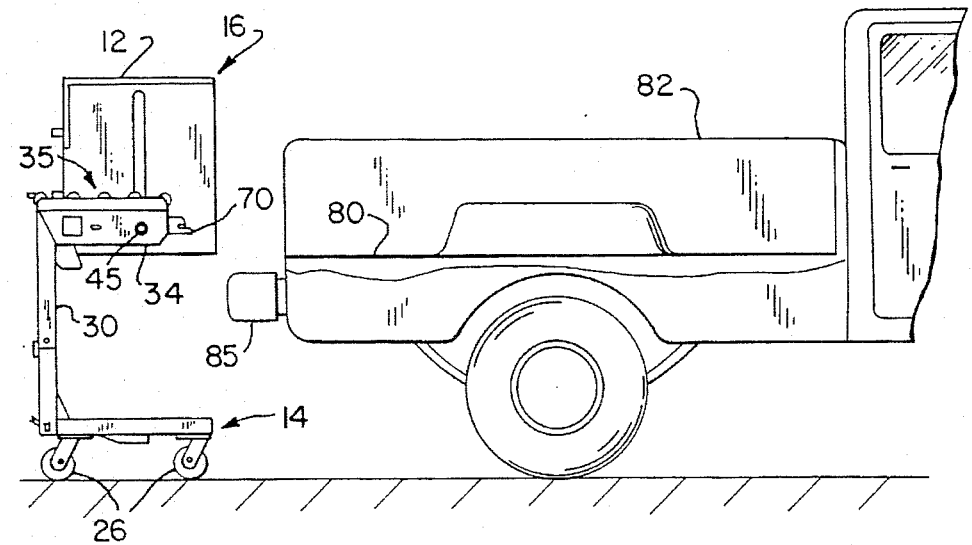
FIG. 14 is a view showing the container in the elevated position.
Figure 15:
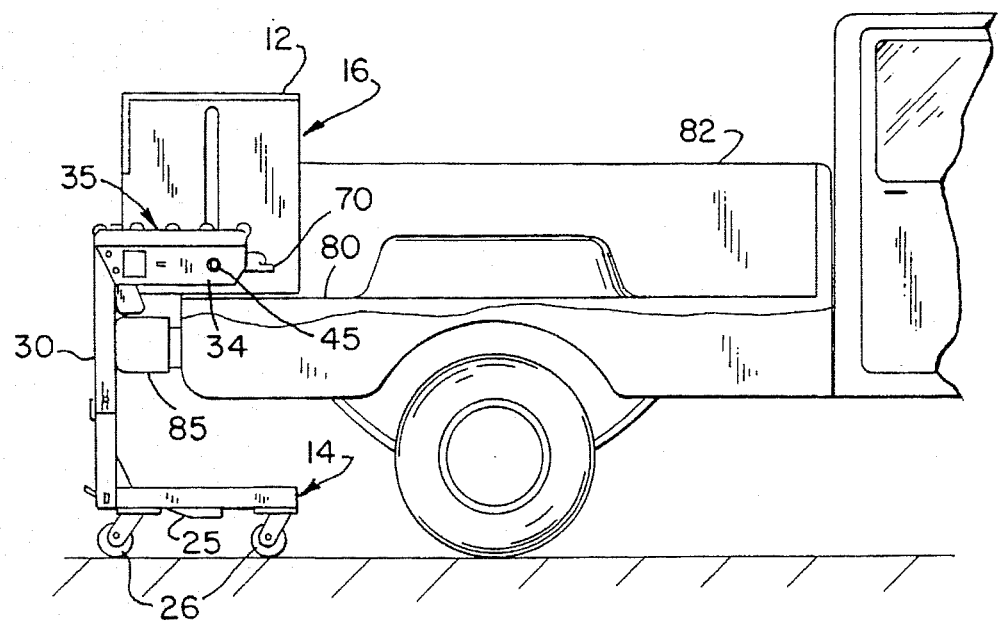
FIG. 15 is a view of the container supported above with the deck of the truck.
Figure 16:
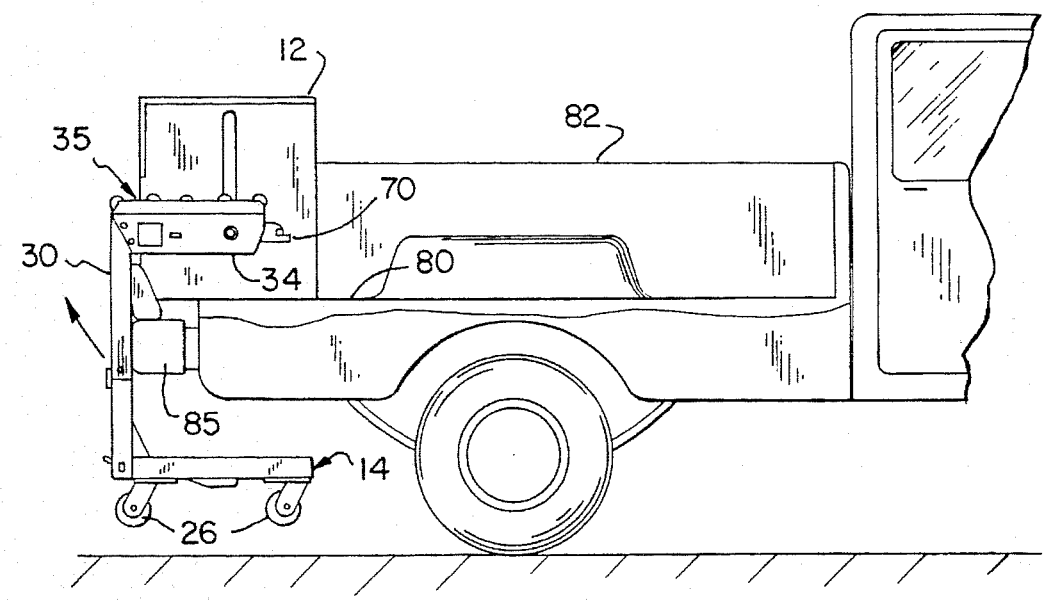
FIG. 16 is a view showing the container resting on the deck of the truck with the support assembly elevated.
Figure 17:
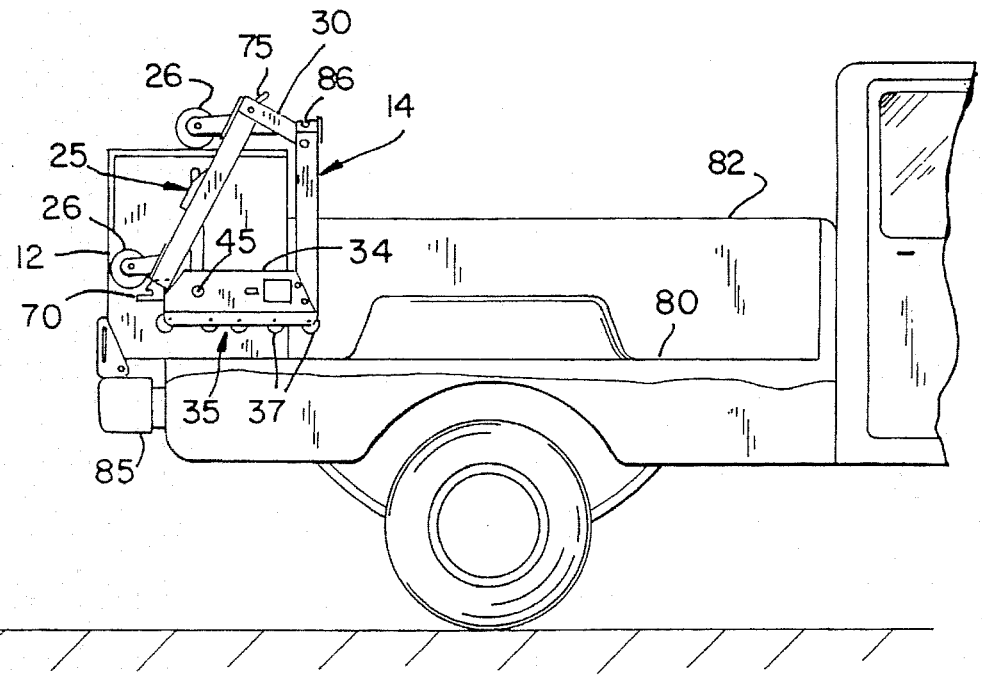
FIG. 17 is a side view of the transporter with the support assembly shown pivoted to the storage position.
Figure 18:
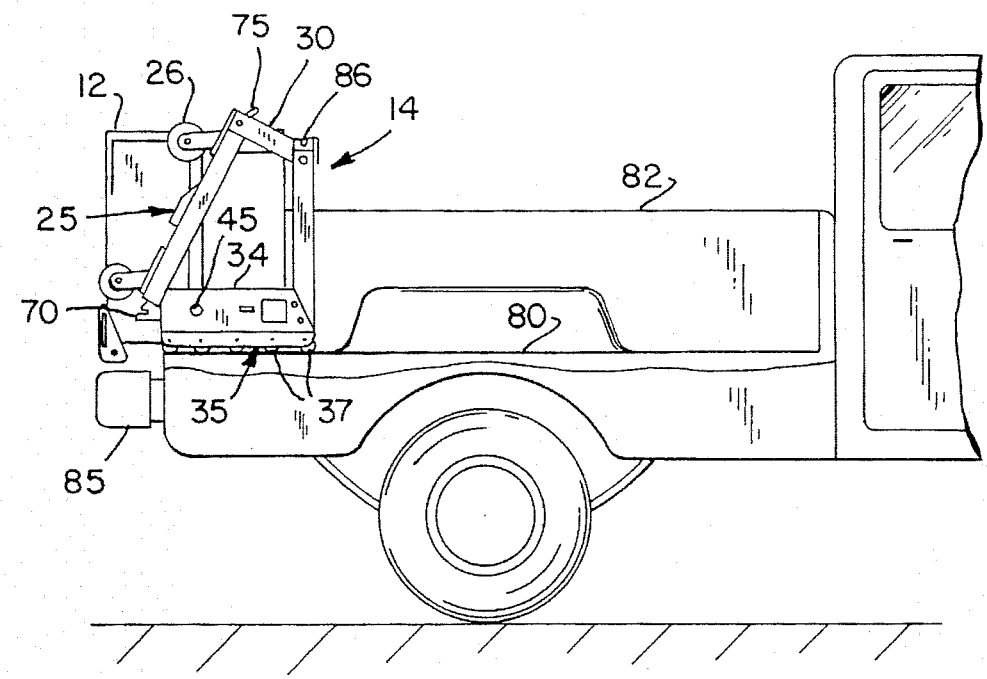
FIG. 18 shows the secondary set of rollers in contact with the deck of the truck.
Figure 19:
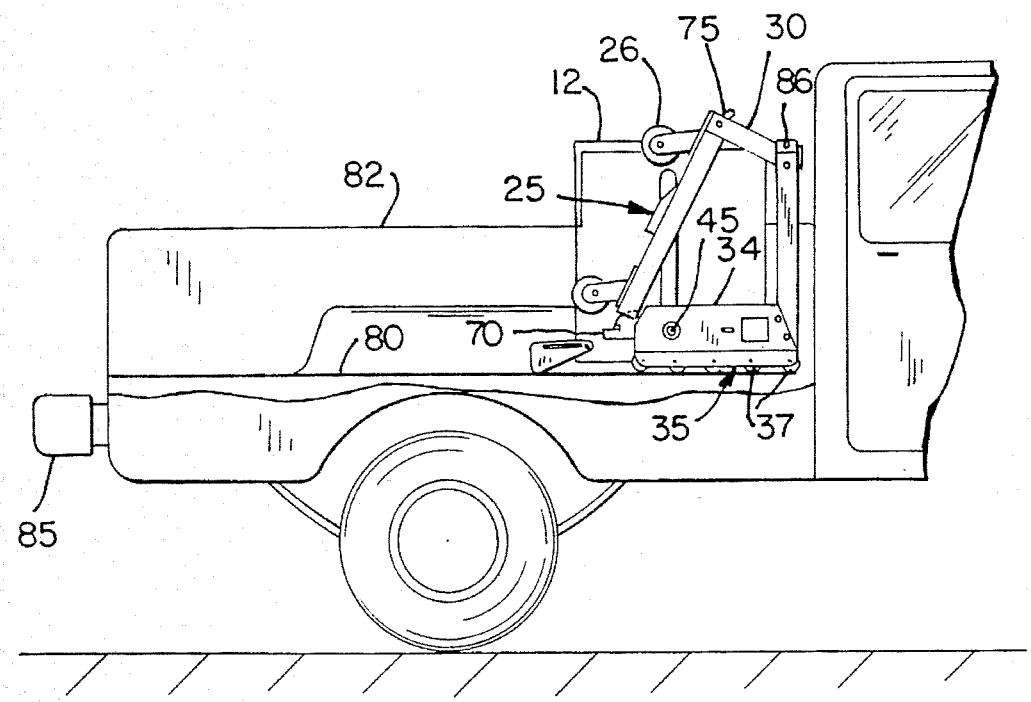
FIG. 19 is a view of the transporter moved to the front of the deck.
Figure 20:
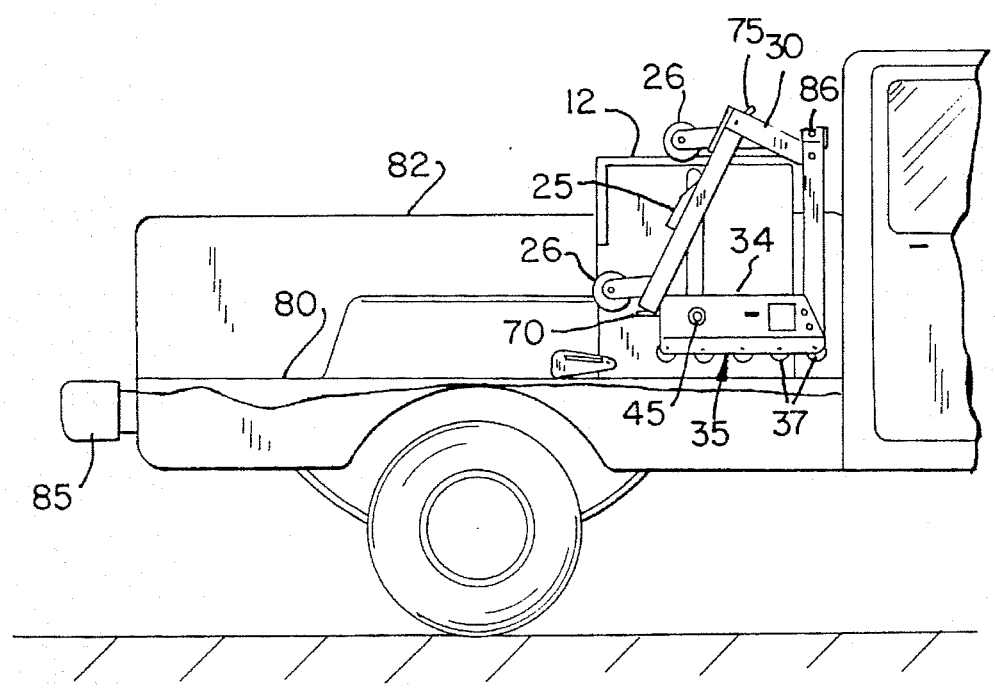
FIG. 20 is a view showing the container set on the deck and the secondary set of rollers raised above contact with the load deck and the support assembly collapsed.

Referring to FIGS. 13 through 20, the sequence in the operation of the transporter 10 is shown for loading a heavy duty unit into a pickup truck. The transporter as shown in FIG. 13 is initially rolled into alignment with the back of a truck 82 which is partially broken away to show the deck 80. The container 12 is supported by the lift assembly 16 which is shown supported on the brackets 34 of the support assembly 14. The lift assembly 16 is actuated to elevate the container 12 to a position above the deck 80 of the truck as shown in FIG. 14. The transporter 14 is then rolled into engagement with a bumper 85 with the lift frame 16 suspended above the deck 80 as shown in FIG. 15. The lift assembly 16 is lowered to set the container 12 on the deck 80 and a pair of attached loading legs 90 onto the bumper 85. The support assembly 14 is then elevated as shown in FIG. 16 sufficiently to clear the wheel assembly 26 from the ground. The support assembly 14 is then rotated to the storage position as shown in FIG. 17. As noted herein the support assembly 14 is biased by the gas spring 56 so that the operator can easily and quickly pivot the support assembly 14 to the storage position. The lift assembly 16 is then reversed to move the secondary roller assembly 35 into contact with the deck 82 as shown in FIG. 18. The transporter is pushed forward on the roller assembly 35 to the front of the deck as shown in FIG. 19. The lift assembly is then actuated to raise the support assembly off the deck 80 so that the container rests on the deck.

Thus, it should be apparent that there has been provided in accordance with the present invention a self-loading material or equipment transporter that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The embodiments of the invention in which an exclusive property or privilege is claimed are defined as follows:

1. A transporter for moving itself and a container between a first surface disposed at a lower level and a second surface disposed at a higher level, the transporter comprising:
   a transport assembly having at least one base leg, at least one mounting bracket, and at least one connecting leg extending between the base leg and the mounting bracket to form a generally C-shaped support frame,
   a first set of rollers disposed on said base leg,
   a second set of rollers disposed on said mounting bracket; and
   a lift assembly mounted on said mounting bracket for supporting the container on the transport assembly, the lift assembly being configured to raise and lower the container with respect to the second surface while the transport assembly allows the container to be moved generally horizontally with respect to the second surface whereby the transporter is transportable at either the lower level or at the higher level.

2. The transporter according to claim 1 including means for pivotally supporting said support assembly on said lift assembly whereby said second set of rollers support said container for movement on the platform.

3. A transporter for moving itself and a load between a first surface disposed at a lower level and a second surface disposed at a higher level, the transporter comprising:
   a load-holding member;
   a lift assembly connected to said load-holding member and operable to raise and lower said load-holding member;
   a support assembly for supporting said load-holding member, said support assembly including a leg member pivotally mounted on said lift assembly for movement between a lower transport position and an upper stored position; and
   wheel means on said leg member for providing movement for said support assembly, lift assembly and load-holding member when said leg member is in either said lower transport position or said upper stored position, said wheel means includes a first set of rollers providing movement in said lower transport position and a second set of rollers providing movement in said upper stored position.

4. The transporter of claim 3, wherein said lift assembly includes at least one rotatable threaded rod and said support assembly includes a corresponding nut for operatively engaging said threaded rod, wherein the lift assembly moves upwardly or downwardly with respect to the support assembly in response to the direction of rotation of the threaded rod.

5. The transporter of claim 4, wherein the lift assembly is powered by an electric motor.

6. The transporter of claim 5, wherein the electric motor is powered by a storage battery, the electric motor and storage battery being mounted to the lift assembly.

7. The transporter of claim 4, wherein the lift assembly is powered by a hand crank.

8. The transporter of claim 3, wherein the leg member of said support assembly includes a pair of parallel base legs, a pair of parallel mounting brackets and a pair of legs connecting the base legs to the mounting brackets, and means mounted on each of said brackets for supporting the lift assembly.

9. The transporter according to claim 8 including means for biasing the support assembly to the upper stored position.

10. The transporter according to claim 9 including means for locking the support assembly in the lower transport and the upper stored positions.

* * * * *